Figure 5:
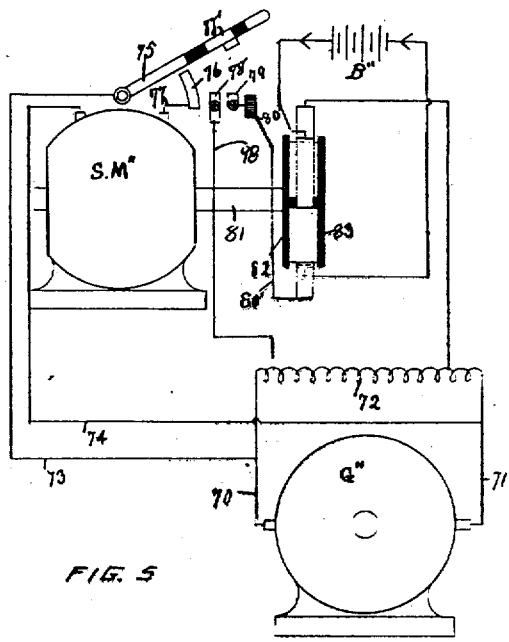

C. J. QUILL.
ALTERNATING CURRENT RECTIFIER.
APPLICATION FILED JAN. 31, 1917. RENEWED AUG. 18, 1921.
1,395,521.
Patented Nov. 1, 1921.
2 SHEETS—SHEET 1.
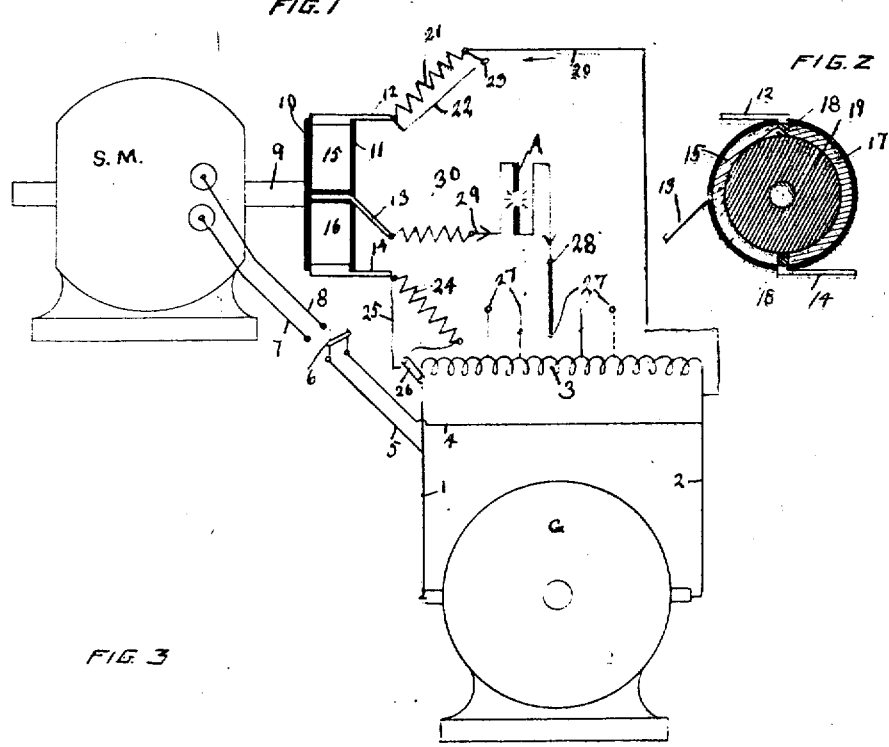
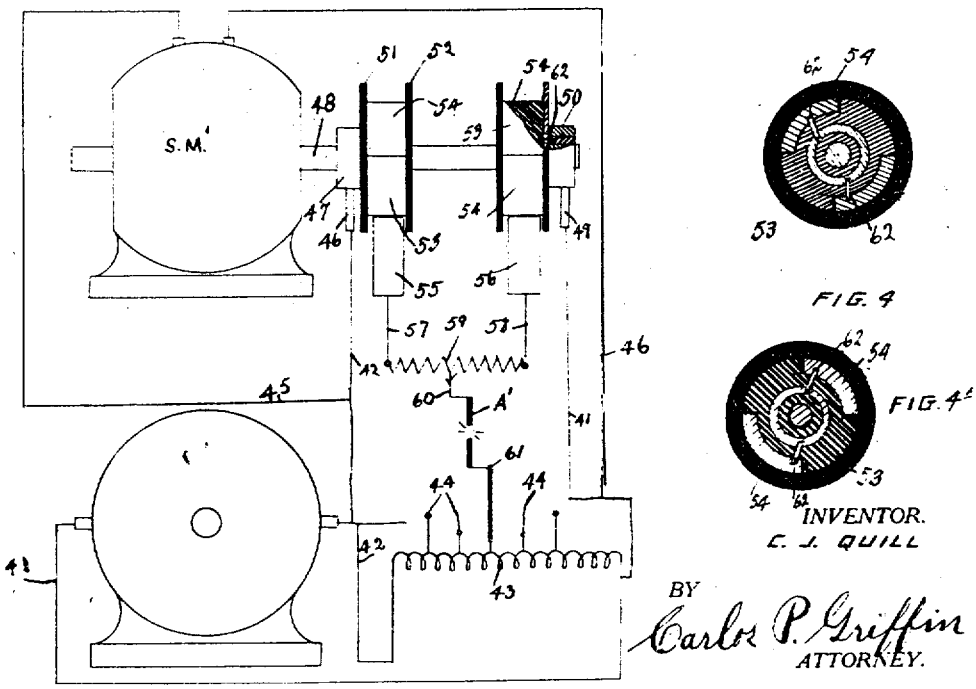
INVENTOR.
C. J. QUILL
BY
Carlos P. Griffin
ATTORNEY.

C. J. QUILL.
ALTERNATING CURRENT RECTIFIER.
APPLICATION FILED JAN. 31, 1917. RENEWED AUG. 18, 1921.

1,395,521.

Patented Nov. 1, 1921.
2 SHEETS—SHEET 2.

INVENTOR.
C. J. QUILL

BY
Carlos P. Griffin
ATTORNEY.

UNITED STATES PATENT OFFICE.

CHARLES J. QUILL, OF SAN FRANCISCO, CALIFORNIA, ASSIGNOR OF ONE-HALF TO WILLIAM M. FILBEN, OF ST. PAUL, MINNESOTA.

ALTERNATING-CURRENT RECTIFIER.

1,395,521.   Specification of Letters Patent.   Patented Nov. 1, 1921.

Application filed January 31, 1917, Serial No. 145,789. Renewed August 18, 1921. Serial No. 493,462.

*To all whom it may concern:*

Be it known that I, CHARLES J. QUILL, a citizen of the United States, residing at San Francisco, in the county of San Francisco, State of California, have invented a new and useful Alternating-Current Rectifier, of which the following is a specification in such full and clear terms as will enable those skilled in the art to construct and use the same.

This invention relates to an alternating current rectifier, an object of which is to provide an extremely simple form of current rectifier mechanism which will be capable of supplying batteries or arc lights with direct current or other appliances requiring direct current.

Another object of the invention is to produce an apparatus which will be extremely simple in construction and which will give a very high efficiency in return of electric current transformed for electric current used.

It is to be observed that a synchronous motor is used throughout the several modifications shown capable of making 1800 R. P. M. where 60 cycle alternating current is used, or that the speed in R. P. M. of the synchronous motor shall be one half the frequency per minute of the alternating current supply.

Other objects of the invention will appear as the description proceeds.

An embodiment of the invention is shown in the drawings in which the same reference numeral is applied to the same portion throughout, but I am aware that there may be many modifications thereof.

In the drawings Figure 1 is a view in side elevation partly diagrammatic of a generator, synchronous motor and the windings for producing direct current from alternating current, where three brushes are used on the commutator.

Figure 6:
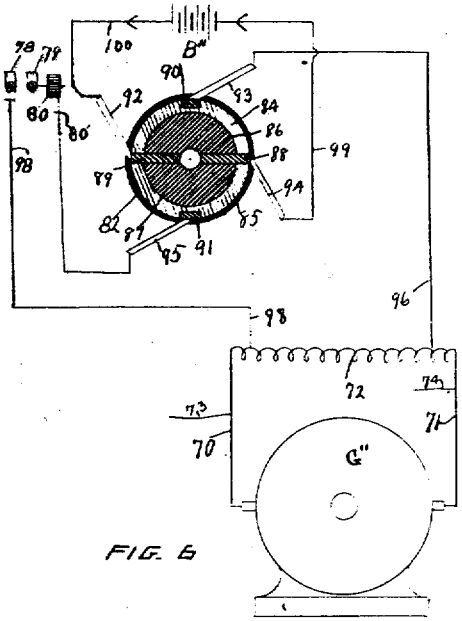
Figure 7:
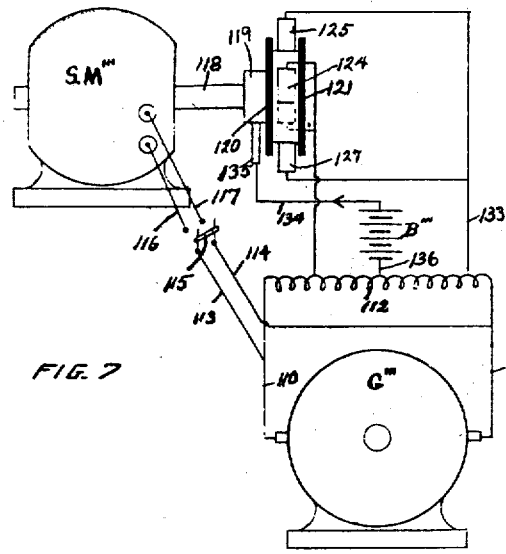
Figure 8:
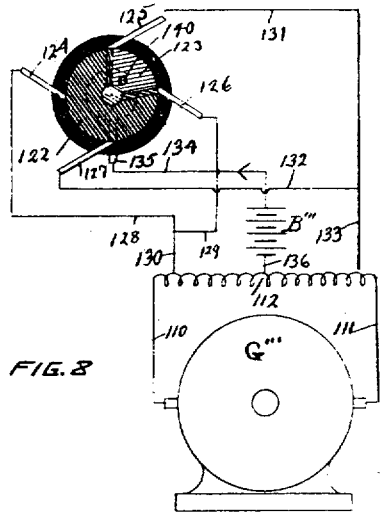

Fig. 2 is a sectional view of the commutator showing the position of the brushes in contact therewith, Fig. 3 is a side elevation, partly diagrammatic, of a slightly different form of the apparatus in which two alternating current brushes and two direct current brushes are used in connection with two commutators, Figs. 4 and 4ᵃ are vertical sectional views of the commutators shown in Fig. 3, Fig. 5 is a side elevation, partly diagrammatic, showing a modified form of the apparatus in which four brushes are used in connection with a commutator having two segments only, Fig. 6 is a diagrammatic view of a portion of the apparatus shown in Fig. 5 with the commutator turned 90 degrees and shown in section to show its construction, Fig. 7 is a side elevation partly diagrammatic of a slightly different form of the apparatus in which four brushes are used on the commutator but which has only 90 degrees of its metallic periphery in contact with a brush at any time, and Fig. 8 is a view partly diagrammatic showing the commutator of Fig. 7 turned 90 degrees and shown in section.

In Fig. 1 G indicates the generator, SM the synchronous motor, and A an arc light, which is operated by the direct current produced. The generator has two line wires 1 and 2 which lead to an auto transformer 3, taps 4 and 5 extending to a double pole switch 6, and serving to supply the wires 7 and 8 leading to the synchronous motor with the current necessary to operate the latter. The synchronous motor is provided with a shaft 9 on which the commutator is mounted. The commutator comprises two disks 10 and 11, which form guards to prevent the brushes 12, 13 and 14 from working off the side of the segments 15 and 17, and which segments are separated by means of blocks of insulating material as illustrated at 18. The segments 15, 17 and 18 are mounted upon a spool of insulating material 19, and form a true cylindrical track for the brushes to run on. The brush 12 is connected with the main lead wire 2 by means of a wire 20; the resistance 21 with cut out wire 22 and switch 23 being provided to increase or diminish the resistance in the wires leading to the brushes as may be necessary. The brush 14 is connected by means of the resistance 24 cut out wire 25 and switch 26 with the main lead wire 1. The auto transformer 3 has a plurality of outlets 27 with the central one of which the wire 28 leading to the arc light 8 is connected. A wire 29 with suitable resistance 30 connects the brush 13 with the opposite pole and the arc light A.

In the foregoing construction if the several circuits are traced it will be seen that the current will always flow in one direction through the arc carbons. For assuming the synchronous motor to operate at the same speed as the generator it will effect the changes of poles at the same rate the changes are effected by the generator.

Assuming an alternation in the wire 20 in the direction of arrow and a clockwise rotation of the commutator current will be delivered through segment 15 down through the arc for 90 degrees from the brush 12 to the brush 13. After the commutator has moved 90 degrees the brush 13 and the brush 14 will contact with the half segment 17 thereby producing a flow of current from the brush 14 through segment 17, brush 13, and then through the arc, and since it is connected with the other outlet of the auto transformer 3 the current will flow in the same direction through the arc as it previously did. The remainder of the travel produces exactly the same results with the segments in reversed position.

In the form of the apparatus shown in Figs. 3 and 4, the generator is indicated at G', the synchronous motor at SM' and the arc light at A'. The generator is provided with lead wires 41 and 42 which extend to the auto transformer 43, the latter having a plurality of outlets 44 to vary the voltage of the rectified current in accordance with the requirements. Wires 45, 46 extend to the synchronous motor from the lead wires 41, 42, and the lead wire 42 is also connected with an alternating current brush 46 bearing upon an alternating current ring 47 carried by the shaft 48 of the synchronous motor. The wire 41 also extends to the alternating current brush as indicated at 49 which bears upon an alternating ring 50 also carried by the shaft 48. The commutators, in this instance, each comprise the alternating current rings 47 and 50 with two guard disks 51, 52, and a disk of insulating material 53 between said guard disks in which are seated the two metallic segments 54, there being two of the commutators on the shaft 48. Their relation to the brushes 55, 56 is such that when one of the segments 54 is in contact with the brush 55 that the segments 54 on the other pole changer do not come in contact with the brush 56, being placed just 90 degrees from the other one. Wires 57, 58 connect with a reactance resistance 59 from the center of which a wire 60 extends to the arc light A'. From the other pole of the arc light A', a wire 61 leads to one of the outlets of the auto transformer 43. The alternating current rings 47 and 50 are insulated from the shaft and are connected by means of a wire 62 with the segments 54 in each instance.

Now assuming the alternation in the wire 42 to be at the present time in such a direction as to deliver current to the brush 55 and arc light A' in the direction of the arrow adjacent the arc it will be seen that when in the position 90 degrees different that current will be traveling up in the wire 41 and hence will travel through the alternating current ring 50 and brush 56 to the arc in the same direction as the previous current therethrough.

In the construction just outlined it will be apparent that current will flow through the arc in the same direction all of the time, except when the brushes are on the dead points but that its voltage will be dependent upon the place of connection of the wires 41 and 42 with the auto transformer 43. In Figs. 5 and 6 the generator is indicated at G'', the synchronous motor at SM'' and a battery receiving direct current at B''. Wires 70, 71 extend from the generator to an auto transformer 72, and wires 73 and 74 lead from the main supply wires to the synchronous motor and to an automatically releasing switch lever 75 respectively. The switch lever 75 contacts with an arc shaped plate 76 which has a wire 77 connected with the other pole of the synchronous motor, the object of said construction is to start the synchronous motor as soon as the handle of the switch has been moved a short distance, and when it is moved through a farther distance, its plate 77' connects the contacts 78 and 79 so that a current is then passed through the coil 80, and the switch lever is held down by said magnet. The shaft 81 of the synchronous motor carries a pole changer, which in this instance comprises two guard disks 82, 83, two half circle metallic segments 84, 85, mounted on a pair of insulating disks 86, 87, and the ends of which are separated by means of the insulating plates 88, 89. The segments 84 and 85 are substantially 180 degrees in extent, and at their middle points they have insulation bars 90 and 91 let into them to prevent short circuit of the apparatus in a manner that will be presently explained.

There are four brushes 92 to 95 inclusive placed around the commutator 90 degrees apart. The brushes 93 95 are connected with the auto transformer wires 96 and 80', 98 respectively. While the brushes 92, 94 are connected with the wires 100, 99 respectively leading to the battery respectively.

The result of the foregoing construction is that, whenever there is a complete circuit closed (with the switch 75 closed) between the wires 96 and 98, alternating current will flow in said wires; and assuming the commutator to move anti-clockwise Fig. 6 it will be seen that there will be a complete circuit through the battery by way of the brush 95, segment 85, brush 94, wire 99, battery, wire 100, brush 92, segment 84 and brush 93 back to the wire 96 on the opposite side of the auto transformer. When the position of the commutator is just reversed, the current direction will be just reversed thereby causing a unidirectional flow of current through the wire 99 and battery. The insulation points 90 and 91 are put in for the purpose of preventing a short circuit between the brushes in certain positions as would occur were they not inserted, and if the current goes off momentarily, the switch lever 75 opens the entire circuit.

In Figs. 7 and 8 there is shown a further modification of the commutator in which four brushes and a single contact segment slightly less than 90 degrees is used. In these figures the numeral 110 indicates one of the lead wires extending from the generator G''', the other wire extending therefrom to the auto transformer 112. Wires 113, 114 connect the main lead wires with double pole switch 115 from which wires 116, 117 extend to the synchronous motor SM'''. The synchronous motor shaft 118 carries the commutator which has a ring 119 thereon, two guard disks 120, 121, between which guard disks there is an insulated disk 122 having a metallic segment 123 let thereinto, and the surface of which extends over an arc of less than 90 degrees. Four brushes 124 to 127 inclusive are placed 90 degrees apart around the commutator. The brushes 121, 126 are connected by means of the wires 128, 129, with one pole 130 of the auto transformer, and the two brushes 125, 127 are connected by means of the wires 131, 132 with the wire 133 leading to the other pole of the auto transformer 112. A wire 134 connects with the brush 135 which contacts with the ring 119 and on the opposite pole of the battery a wire 136 extends to the center of the auto transformer 112.

The result of the foregoing construction is that as the commutator is rotated that only one of the brushes 124 to 127 will be in contact with the segments 123 at a time, but since that segment is connected with the ring 119 by means of the pin 140 during substantially all the time there will be a possibility of current flowing through the battery connections from the center of the auto transformer.

For example, supposing the alternation at the present instant Fig. 8 to be down in the wire 133, 131 brush 125, segment 123, ring 119 up in brush 135, wire 134, battery and wire 136 to the auto transformer 112 current will pass through the battery. This condition will continue until the segment 123 leaves the brush 125. As soon as the segment 123 leaves the brush 125 it will contact with the brush 124 and will deliver current thereto because at this time the current wave in the wire 128 is also coming toward the commutator, and the same effect continues as the commutator rotates, the current through the battery being always unidirectional.

Having thus described my invention, what I claim as new and desire to secure by Letters Patent of the United States, is as follows:—

1. An alternating current rectifier comprising a source of alternating current supply, a synchronous motor connected therewith, an auto transformer connected with a source of electric current supply, a commutator having two oppositely placed segments carried by the shaft of the synchronous motor, a plurality of brushes bearing upon the commutator, an alternating current circuit connected with certain of said brushes, a direct current circuit connected with one of said brushes and with the auto transformer whereby a direct current load in the latter circuit is supplied with unidirectional current.

2. An alternating current rectifier comprising a source of alternating current supply, a synchronous motor operated thereby, a commutator having two oppositely placed segments carried by the shaft of the synchronous motor, a plurality of brushes bearing upon said commutator, connections between certain of said brushes and the main circuit, a direct current load, an electric circuit connecting one of said brushes and the direct current load with the auto transformer whereby upon the operation of the synchronous motor direct current will be delivered to said load.

In testimony whereof I have hereunto set my hand this 15th day of Jan. A. D. 1917.

CHARLES J. QUILL.